United States Patent
Sulander et al.

(10) Patent No.: US 9,449,289 B2
(45) Date of Patent: Sep. 20, 2016

(54) MOBILE TERMINAL, SYSTEM, COMPUTER PROGRAM PRODUCT, AND METHOD FOR UPDATING A WORK PLAN

(75) Inventors: Saku A. Sulander, Espoo (FI); Mikko Haikonen, Espoo (FI); Jouni Soitinaho, Espoo (FI); Jari Kulkki, Helsinki (FI); Peng Zhang, Espoo (FI); Jani Niittukari, Espoo (FI)

(73) Assignee: Vringo Infrastructure Inc., New York, NY (US)

( * ) Notice: Subject to any disclaimer, the term of this patent is extended or adjusted under 35 U.S.C. 154(b) by 1122 days.

(21) Appl. No.: 11/615,327

(22) Filed: Dec. 22, 2006

(65) Prior Publication Data
US 2008/0153510 A1 Jun. 26, 2008

(51) Int. Cl.
| | | |
|---|---|---|
| *H04W 68/00* | (2009.01) | |
| *G06F 7/00* | (2006.01) | |
| *G06Q 10/06* | (2012.01) | |
| *G06Q 10/08* | (2012.01) | |
| *G06Q 30/06* | (2012.01) | |
| *G06Q 50/28* | (2012.01) | |
| *H04W 4/02* | (2009.01) | |
| *H04L 29/08* | (2006.01) | |

(52) U.S. Cl.
CPC .............. *G06Q 10/06* (2013.01); *G06Q 10/08* (2013.01); *G06Q 10/087* (2013.01); *G06Q 30/06* (2013.01); *G06Q 50/28* (2013.01); *H04L 67/12* (2013.01); *H04L 67/18* (2013.01); *H04W 4/02* (2013.01)

(58) Field of Classification Search
CPC ................... G06K 2017/0745; G06Q 10/087; G06Q 50/265
USPC ........................................... 455/404.2, 456.3
See application file for complete search history.

(56) References Cited

U.S. PATENT DOCUMENTS

| | | | |
|---|---|---|---|
| 6,747,560 B2 * | 6/2004 | Stevens, III | ....... G08B 13/2462 235/376 |
| 2002/0080198 A1* | 6/2002 | Giraldin et al. | ............... 345/864 |
| 2002/0111172 A1* | 8/2002 | DeWolf et al. | ............... 455/456 |
| 2006/0043201 A1 | 3/2006 | Vesikivi et al. | |
| 2006/0044141 A1 | 3/2006 | Vesikivi et al. | |
| 2006/0168300 A1* | 7/2006 | An et al. | ....................... 709/231 |

* cited by examiner

*Primary Examiner* — Joshua Schwartz
(74) *Attorney, Agent, or Firm* — Cozen O'Connor (57) ABSTRACT

A method, a computer program product, a mobile terminal, and system are provided. For example, the method includes receiving a work plan comprising at least one work item with a mobile terminal, wherein the work item includes an initial location of at least one identification device. The method also includes reading identification information contained on the identification device with the mobile terminal and identifying a deployed location of the identification device. Moreover, the method includes providing the identification information and the deployed location such that the work plan can be updated.

32 Claims, 4 Drawing Sheets

MOBILE TERMINAL, SYSTEM, COMPUTER PROGRAM PRODUCT, AND METHOD FOR UPDATING A WORK PLAN

BACKGROUND OF THE INVENTION

1) Field of the Invention

Embodiments of the present invention relate to identification devices used in conjunction with mobile terminals and, more particularly, to techniques for updating a work plan using a mobile terminal.

2) Description of Related Art

Automatic identification systems have been developed for various applications, such as service industries, purchasing and distribution logistics, time and attendance, manufacturing, and material flow systems. For example, radiofrequency identification (RFID) tags have been used for identification purposes and gained popularity due to their small size and relatively low cost. As known to those of ordinary skill in the art, information stored on the RFID tag may be read by a RFID tag reader using radiofrequency signals. The RFID tag may be passive (i.e., activated via interrogation) or active (i.e., activated via an independent power source) and be capable of wirelessly communicating with the tag reader.

Moreover, the ability to wirelessly communicate with a RFID tag has prompted the integration of various wireless devices with tag reading capabilities. For instance, U.S. Patent Application Publication No. 2006/0043201 to Vesikivi et al. discloses the implementation of a personal communication device (e.g., cellular phone) with a RFID tag reader.

One particular application of RFID tags and wireless devices includes the supervision of workers. For example, U.S. Patent Application Publication No. 2006/00441141 to Vesikivi et al. discloses a system and method for supervising workers that includes using a worker device to access a storage element (e.g., a RFID tag) associated with a workplace location.

Despite these improvements of integrating wireless devices and identification devices, there is a need for methods to efficiently update a work plan using a mobile terminal. In addition, there is a need for methods to deploy an identification device with a mobile terminal such that the identification device may be readily located and identified in the future.

BRIEF SUMMARY OF THE INVENTION

Embodiments of the invention address the above needs and achieve other advantages by providing a mobile terminal, system, a computer program product, and a method for updating a work plan with a mobile terminal. Generally, embodiments of the present invention include receiving a work plan that includes one or more work items including an initial location of an identification device, such as a radiofrequency identification (RFID) tag. The actual or deployed location and identification information associated with the identification device is provided using a mobile terminal in order to update the work plan. As such, the updated work plan may be used in the future using the information obtained while determining the deployed location and identification information of the identification device.

According to one embodiment, a method and associated computer program product are provided. For example, the method includes receiving a work plan including at least one work item to a mobile terminal, wherein the work item includes an initial location at least one identification device. The method also includes reading identification information contained on the identification device with the mobile terminal and identifying a deployed location of the identification device. Moreover, the method includes updating the work plan with the identification information and the deployed location.

Additional aspects of the method include transmitting the identification information and deployed location to a network entity for updating the work plan. The deployed location may be provided in various manners. The method could further include determining a deployed location of the mobile terminal with a location device residing on the mobile terminal. In addition, the method could include defining a deployed location of the identification device in the work plan according to the location of the mobile terminal prior to reading the identification information. The method may also allow a user to select a work item within the work plan based on the location of the identification device defined by the location of the mobile terminal prior to reading the identification information. Furthermore, the providing step may include providing a deployed location of the identification device by defining the deployed location of the identification device according to the location of the mobile terminal. The deployed location of the identification device may be displayed on the mobile terminal. The reading step could occur approximately simultaneously with defining a deployed location of the identification device according to the location of the mobile terminal. Further aspects of the method include attaching the identification device to a physical location associated with a work item. The method may also include storing the identification information and the deployed location with the mobile terminal.

An additional aspect of the present invention provides a system that includes a processor configured to receive a work plan comprising at least one work item including an initial location of at least one identification device. The processor of the mobile terminal of this embodiment is also configured to receive: (i) identification information contained on the at least one identification device and (ii) a deployed location of the at least one identification device to permit the work plan to be updated. The system also includes a network entity that is configured to receive the identification information and the deployed location for updating the work plan.

In one embodiment, the system may be embodied as a mobile terminal and may include a receiver configured to receive the work plan and a reader configured to read identification information contained on the at least one identification device. The mobile terminal may also include a user interface configured to allow a user to provide the deployed location of the identification device. The mobile terminal may include a location device (e.g., a global positioning system) configured to provide a location of the reader which the processor may, in turn, interpret as the deployed location of the at least one identification device. The mobile terminal may also include a display configured to display the deployed location of the at least one identification device and associated identification information. Further, the mobile terminal may include a memory configured to store the deployed location of the at least one identification device and associated identification information.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Figure 1:
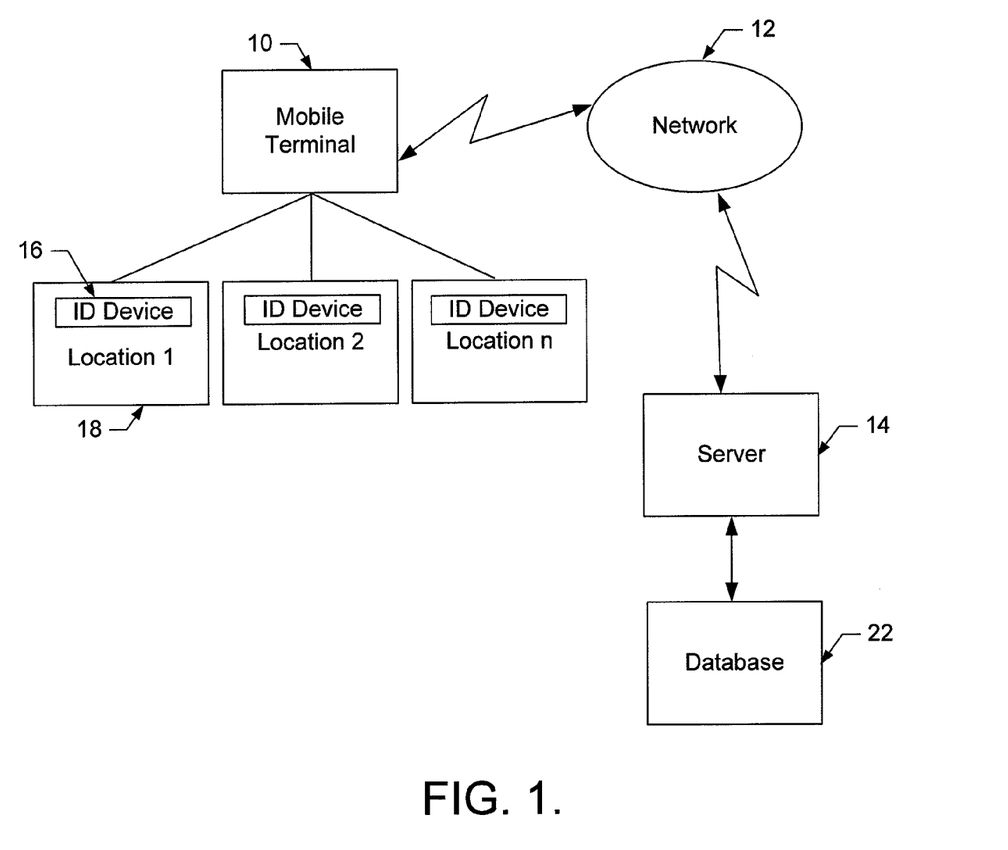
FIG. 1 is a schematic block diagram illustrating a mobile terminal in communication with a server via a network, according to one embodiment of the present invention.

Referring now to the drawings and, in particular to FIG. 1, one exemplary embodiment of the invention, there is shown a mobile terminal 10 in communication with a network entity, such as a server 14, via a network 12. As will be explained in further detail below, the mobile terminal 10 is used to update a work plan maintained by the server 14 by deploying an identification device 16 at a desired location 18 or updating the location of an identification device. The mobile terminal 10 may provide information regarding the location of the identification device 16, as well as obtain identification information contained on the identification device. Thus, the work plan may be updated in the database 22 maintained by the server 14 such that each identification device may be located using the work plan in the future. For purposes of example, the network entity will be described and illustrated as a server, although the mobile terminal may be in communication with other types of network entities in order to exchange information relating to the work plan.

Figure 2:
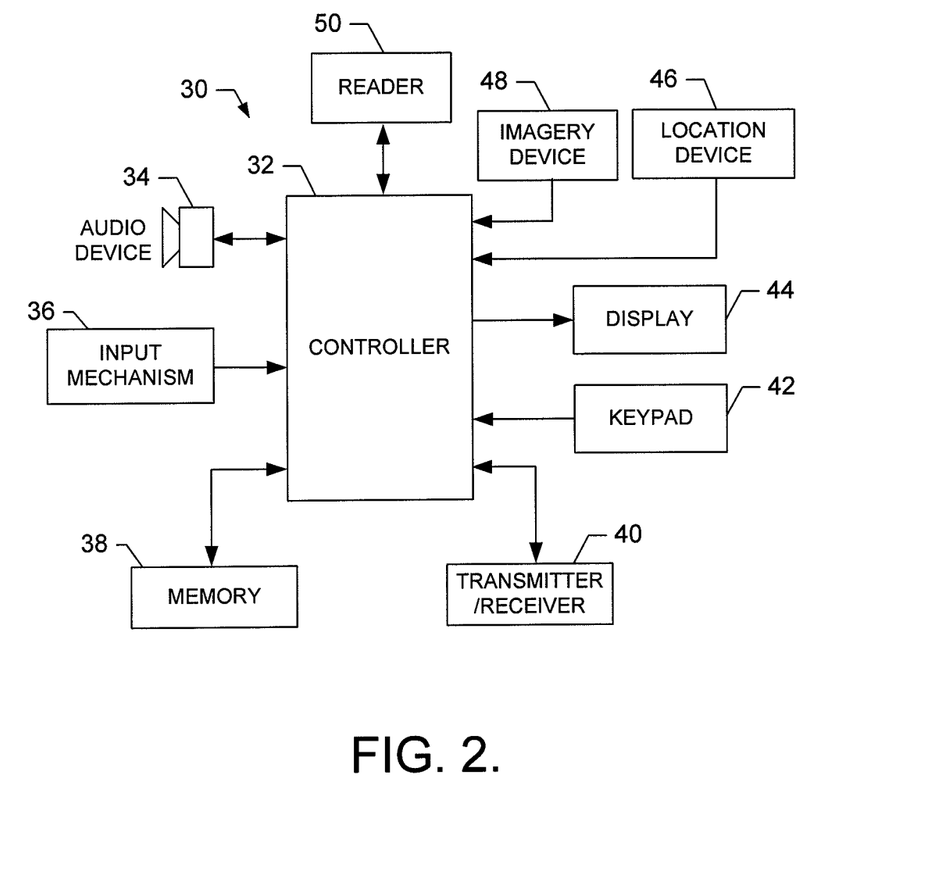
FIG. 2 is a schematic block diagram of a mobile terminal according to one embodiment of the present invention.

One suitable mobile terminal 10 is illustrated by a block diagram of FIG. 2, one exemplary embodiment of the invention. It should be understood, that the terminal illustrated and hereinafter described is merely illustrative of one type of terminal that would benefit from embodiments of the present invention and, therefore, should not be taken to limit the scope of the present invention. As such, "mobile terminal" is not meant to be limiting and could include other types of hand held and communication devices, such as RFID tag reader devices, mobile telephones, portable digital assistants (PDAs), pagers, laptop computers, digital cameras or camcorders, digital audio/video devices, mobile televisions, location devices (such as GPS devices) and other types of voice, data and/or text communications systems, in any combination of the aforementioned devices, which can readily employ the present invention. Furthermore, while several embodiments of the present invention include a mobile terminal 10, the terminal need not be mobile. Similarly, the system and method of embodiments of the present invention will be primarily described in conjunction with mobile communications applications. It should be understood, however, that the system and method of the present invention can be utilized in conjunction with a variety of other applications, both in the mobile communications industries and outside of the mobile communications industries.

As shown in FIG. 2, the mobile terminal 10 includes a processor such as a controller 32. The controller 32 includes the circuitry required for implementing the functions of the mobile terminal 10 in accordance with embodiments of the present invention, as explained in greater detail below. For example, the controller 32 may be comprised of a digital signal processor device, a microprocessor device, and/or various analog to digital converters, digital to analog converters, and other support circuits. The control and signal processing functions of the mobile terminal 10 are allocated between these devices according to their respective capabilities. The controller 32 provides means for communicating with various components of the mobile terminal 10, such as a location device 46 or a reader 50. The controller 32 may also include the functionality to operate one or more software applications. For example, the controller 32 may be capable of operating a connectivity program, such as a conventional Web browser. The mobile terminal 10 may further include a battery, such as a vibrating battery pack, for powering various circuits that are required to operate the mobile terminal.

In addition to the controller 32, the mobile terminal 10 includes an interface that may include, for example, an audio device 34 having a microphone and conventional earphone or speaker capable of being driven by the controller to present various audible tones during operation of the terminal. The interface may also include a display 44 and an input interface, both of which are also coupled to the controller. The input interface, which allows the terminal to receive data, can comprise any of a number of devices allowing the terminal to receive data, such as a keypad 42, an input mechanism 36 (e.g., touch pad or joystick), a touch display (not shown) or other input device. In embodiments including a keypad 42, the keypad can include one or more keys used for operating the mobile terminal.

The mobile terminal 10 also includes means, such as a transmitter/receiver 40, that is able to transmit and receive messages and information when an appropriate signal is established between the transmitter/receiver and another entity, such as with a cellular transmitter and receiver. Thus, the transmitter/receiver 40 could include an antenna for transmitting signals to, and for receiving signals from, a network 12. The signals include signaling information in accordance with the air interface standard of the applicable cellular system, and also user speech and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second and/or third-generation communication protocols or the like. For example, the transmitter/receiver 40 may be capable of operating in accordance with second-generation (2G) wireless communication protocols IS-136 (TDMA), GSM, and IS-95 (CDMA), with third-generation (3G) protocols such as UMTS, W-CDMA, FOMA, TD-CDMA, TD-SCDMA etc. While the mobile terminal 10 will be described as having a cellular transmitter, the mobile terminal can also have any other type of wireless transmitter/receivers 40 such as for short range radio communication protocols like wireless LAN (WLAN), Bluetooth, WiMAX, UWB (ultra wideband), Wibree, etc.

The network 12 may be part of various communication networks to facilitate communication and data transmission between the mobile terminal 10 and the server 14. For example, the network 12 could be a cellular network, Local Area Network (LAN), a Metropolitan Area Network (MAN), a Wide Area Network (WAN), a proprietary network, a Public Switched Telephone Network (PSTN), a Wireless Application Protocol (WAP) network, or an Internet Protocol (IP) network such as the Internet, an intranet, an extranet, or any other suitable network. According to one embodiment, a cellular network may provide a base station that includes a mobile switching center (MSC), a message center, voice coder/decoders, data modems, and other units required to operate the network 12. The MSC is capable of routing calls and messages to and from the mobile terminal 10 when the mobile terminal is making and receiving messages and/or information. The MSC controls the forwarding of messages to and from the base station when the station is registered with the network. Such messages may include, for example, voice messages received by the MSC from users of Public Switched Telephone Network (PSTN) telephones, and may also include Short Message Service (SMS) messages, Multimedia Messaging Service (MMS) messages, and voice messages received by the MSC from the mobile terminal or other mobile terminals serviced by the network.

The mobile terminal 10 includes a memory 38 that may be volatile or non-volatile, as well as dedicated or assignable. The non-volatile memory, for example, may comprise embedded or removable multimedia memory cards (MMC's), Memory Sticks manufactured by Sony Corporation, EEPROM, flash memory, hard disk or the like. The memory 38 can store any number of pieces of information, and data, used by the mobile terminal 10 to implement the functions of the terminal.

The memory 38 is also able to store information recorded by one or more devices. The information could be collected from audio 34, imagery 48, and location 46 devices. In this regard, the audio device 34, as described above, typically includes a speaker and microphone that is able to send and receive audible tones. The imagery device 48 could be any device capable of recording an image, such as a digital camera for capturing a photograph or video. Furthermore and as explained in further detail below, means, such as a location device 46, are provided for identifying the deployed location of the identification device. In one embodiment, the location device 46 is generally a global positioning system (GPS) receiver but could be any suitable device for providing a location of the mobile terminal 10.

The mobile terminal 10 also includes means, such as a reader 50, that may be used to read information from an identification device 16. The reader 50 may wirelessly communicate with the identification device 16 using various techniques. For example, the reader 50 may be capable of utilizing wireless technology, such as radio frequency emissions (e.g., via broadband, WiFi, Bluetooth®, various RFID standards described by various standardization bodies like ISO and IEEE, etc. communication) or other wireless techniques (e.g., via infrared communication) to communicate with the identification device 16. As such, in instances in which the mobile terminal is hereinafter described to read information from an identification device, the reader of the mobile terminal will be performing the reading operations in at least some embodiments. The identification device 16 may include various types of information, such as a serial number or other information stored on the identification device.

According to one embodiment of the present invention, the identification device 16 is a radiofrequency identification (RFID) tag. Generally, the RFID tag comprises a tag that includes an integrated circuit (IC) chip microprocessor and a resonant circuit formed by a coiled antenna and a capacitor. The RFID tag could be passive, active, read only, and/or read/write. In a passive RFID system, the reader 50, generates a magnetic field at a predetermined frequency. When an RFID tag, which usually can be categorized as being either read-only or read/write, is exposed to the magnetic field, a small electric current is induced in the device's resonant circuit. This circuit provides power to the tag, which then modulates the magnetic field in order to transmit information that is pre-programmed on the tag back to the reader at a predetermined frequency. The controller 32 may then receive, demodulate, and decode the signal transmission, and send the data on to the server 14 for further processing. An active RFID system operates in much the same way, but in an active system the RFID tag includes its own power source, allowing the tag to transmit data and information to the reader 50 without the need for interrogation. Read only RFID tags have a permanent memory that may not be modified, while read/write RFID tags are capable of having updated information written to the RFID tag. The particular transmission range of the identification device 16 may vary from zero to hundreds of feet. In alternative embodiment of the present invention, the identification device 16 can be any device communicating via any short range communication means, e.g. via WLAN, Bluetooth, IrDA, etc.

As described above, the server 14 communicates with the mobile terminal 10 via a network 12. Thus, the server 14 comprises components known to those of ordinary skill in the art that enable communication between the server and the mobile terminal 10 in a network 12, such as those described above with respect to the mobile terminal. The server 14 is generally comprised of a computing device having at least one or more processors and associated memory device(s) as known to those skilled in the art. In one embodiment, the server 14 may comprise any number of conventional components but typically includes a bus, central processing unit (CPU), read-only memory (ROM), random access memory (RAM), storage device, input/output controller, network interface, and software stored in memory and executable by the CPU to direct the functions performed by the server, as all known to those skilled in the art. Any number of servers 14 and mobile terminals 10 may be included in the network 12 and be in communication with one another. The server 14 may include a database 22 or be in communication with an external database for storing one or more work plans or other data. According to one embodiment, the server 14 generates and transmits a new identification device deployment (IDD) work plan to the mobile terminal 10. According to an additional embodiment, the server 14 may also generate and transmit a task work plan to the mobile terminal 10. The task work plan may be based on or created from an IDD work plan in which identification devices' locations are updated. The task plan may be a daily plan including work items to be performed by a worker and may also be defined by a particular time span (e.g., a worker's time shift) or no time at all (i.e., upon request). Alternatively, the user of the mobile terminal 10 may request the IDD work plan or the task work plan from the server 14 or directly access the database 22 of work plans. As used herein, a work plan, such as the IDD work plan or the task work plan, includes one or more work items, wherein at least one work item corresponds to a particular item or task associated with an identification device 16. The work plan may contain any number of work items for any number of uses, such as for security, inspection, or cleaning purposes. For example, a security company may create a work item for a field worker to check if a door is locked at a specific location (e.g., second floor of a building), wherein the door includes an identification device 16 attached thereto. The work plan could include work items associated with tasks throughout the worker's entire shift. The worker could use a mobile terminal 10 to read the identification device 16 and read identification information from the device, which is communicated to the server 14 to verify that the task was performed. The mobile terminal could be actuated to read the identification device following completion of each task, prior to commencement of each task, during the performance of each task or both prior to commencement and following completion of each task. Thus, the work plan may generally provide a checklist for a user to perform each of the work items in the work plan. The user could also use a location device 46 to navigate the user to each location 18 or alert the user when the user is close to a location. The server 14 may create a work plan, or the server may act as an intermediary and receive work plans from one or more clients or other network devices. The server 14 may store and update the work plans in a database 22, such as a worker performs a series of tasks. The database 22 may include a variety of information for each work item, such as a customer name or ID, customer address, location 18 of the identification device 16, and a serial number of the identification device.

Before providing the task work plan to a mobile terminal 10 for performing each of the work items in the work plan, one or more identification devices 16 are deployed at particular locations 18. Each work item in the work plan may include a task or other description and, in one embodiment, an initial, general, current, or approximate location of an identification device 16; however, the actual or deployed location of the identification device and identification information associated with the identification device needs to be provided in order to associate the location and identification of the identification device, such as for performing the work items in the future following deployment or updating a current work item. The actual or deployed location of the identification device 16 is provided due to the fact that the identification device is physically attached to an item at a specific location 18, and the location information is used to direct the user to the location to read the identification device associated with a work item with the mobile terminal 10. Moreover, reading the identification information (e.g., a serial number of the identification device) is necessary to ensure that the identification device 16 is associated with its actual location 18 as the correlation of the identification device and its deployed location may not be provided until the identification device is deployed/attached. Moreover, as indicated above in an alternative embodiment, a task work plan may be used during a worker's daily routine such that the current or initial location of the identification device 16 may be updated with an actual location while performing each of the work items within the work plan. As such, the identification information and associated location of the identification device 16 may be provided in the task work plan, and the location of the identification device updated when reading the identification device.

According to one embodiment, the server 14 generates and transmits to the mobile terminal 10 the new identification device deployment (IDD) work plan to deploy one or more identification devices 16 in particular locations. Alternatively, the user of the mobile terminal 10 may request the IDD work plan from the server 14 or directly access the database 22 of work plans. The IDD work plan includes one or more work items, wherein at least one of the work items corresponds to deploying or attaching one or more identification device 16 in a particular location, such as an area, a spot, a building or a part of building, an apparatus or a part of apparatus, etc. Generally, deployment of the identification device 16 includes attaching an identification device at a location 18 specified in the work plan. For example, identification devices 16 may need to be deployed at new locations 18, or at locations where the identification device has become missing or damaged, which may occur in public places.

Figure 3:
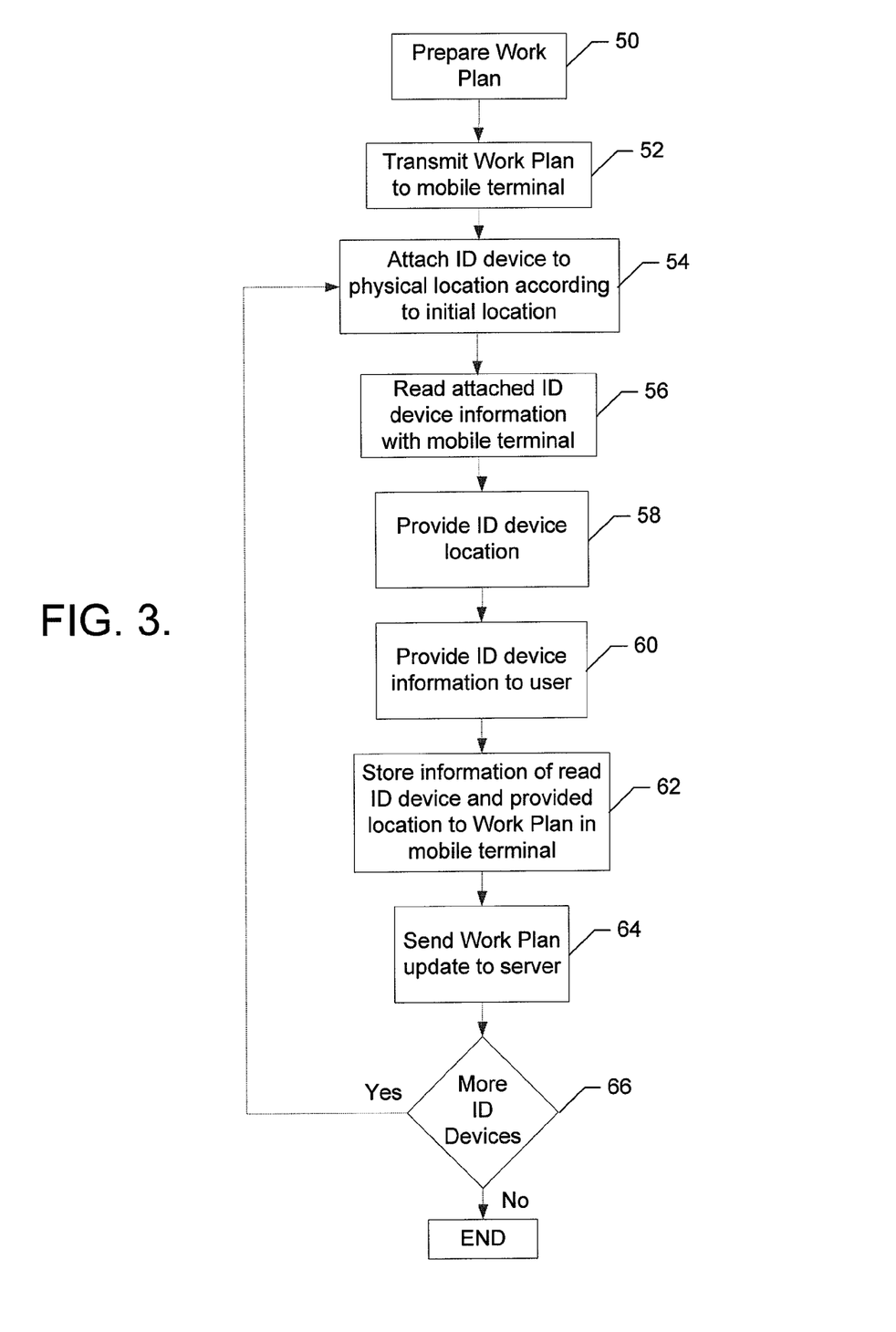
FIG. 3 is a flowchart illustrating various operations employed in deploying an identification device according to one embodiment of the present invention.
Figure 4:
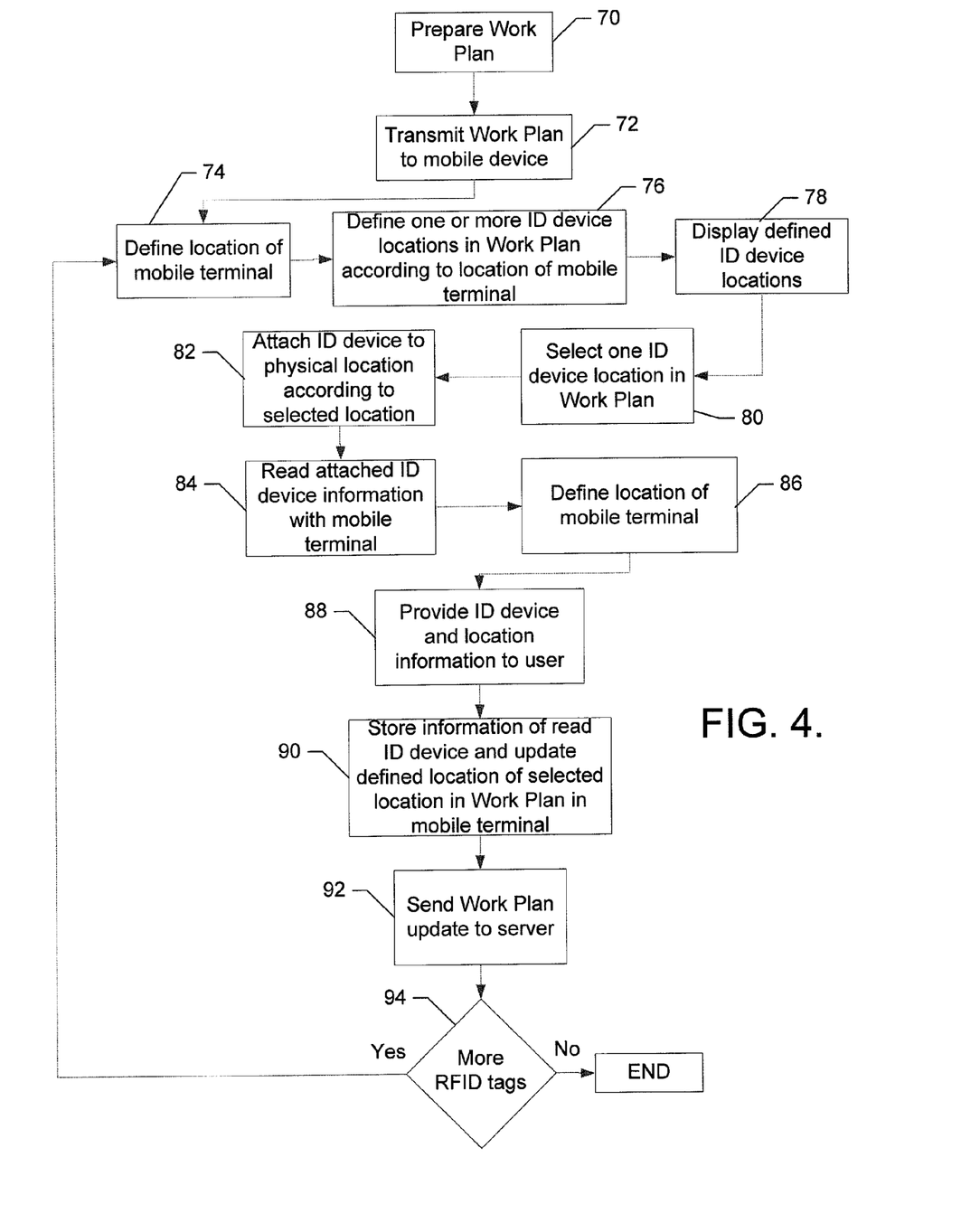
FIG. 4 is a flowchart illustrating various operations employed in deploying an identification device according to an embodiment of the present invention.

Therefore, embodiments of the present invention provide techniques for deploying an identification device 16 with a mobile terminal 10. FIGS. 3 and 4 provide exemplary methods for deploying one or more identification devices 16 with one or more particular locations by the mobile terminal 10. In this regard, FIG. 3, one exemplary embodiment of the invention, includes preparing the IDD work plan (block 50) and transmitting the IDD work plan to a mobile terminal 10 (block 52). The user of the mobile terminal 10 may request the IDD work plan, or the IDD work plan may be provided to the mobile terminal without requesting the IDD work plan, such as at a predetermined time or in predetermined time intervals or simply upon being pushed to the mobile terminal by the server. Initially, the IDD work plan includes one or more work items that include general or initial location information of an identification device 16. The location information associated with the work item may be an address, area or coordinates that directs the user to a particular location, site or apparatus 18. The work item may also include a description of the task that directs the user to the location 18 where the identification device 16 is to be deployed (e.g., all doors in building A).

Upon arriving at the location 18 where the identification device 16 is to be deployed/attached, the user may physically attach the identification device 16 to the location 18 (block 54). For example, the identification device 16 may be attached to a door using various techniques, such as adhesives. The user then reads the identification device 16 with the mobile terminal 10 (block 56). For instance, the mobile terminal 10 may read identification information (e.g., a serial number of the identification device) associated with the identification device 16. The user of the mobile terminal 10 may then provide the actual or deployed location of an identification device associated with the work item (block 58). For example, the user may enter the location 18 of the identification device with the keypad 42 of the mobile terminal 10. The location may be specified as an address, latitude/longitude, coordinates (such as provided by a GPS device or the like), or other information capable of identifying the location of the identification device 16 (e.g., door A in office B). Thus, the specific location provided by the user may be correlated with the identification information of the identification device 16.

The mobile terminal 10 may also read any other information stored on the identification device 16, as well as record information, such as the time and date of reading the identification device. The information read by the mobile terminal 10 may be provided to the user in a human-readable format, such as via a display 44 (block 60), wherein the user may verify the location and contents read from the identification device 16. Furthermore, the user could enter information associated with the identification device 16 or location 18 (e.g., a landmark or street address) with the mobile terminal 10, such as with the keypad 44. The mobile terminal 10 may then store the information read from the identification device 16 and associated location information in memory 38 (block 62) and send the information to the server 14 (block 64). The process may be repeated for any number of identification devices 16 associated with a work item within the work plan (block 66). The mobile terminal 10 may update the work plan before sending the information to the server 14, or the server 14 may update the work plan within the database 22 using the information provided by the mobile terminal.

FIG. 4 illustrates one exemplary embodiment of the invention for deploying an identification device 16 with a mobile terminal 10. Similar to the method described with respect to FIG. 3, the method of FIG. 4 includes preparing a IDD work plan including one or more work items that each include an approximate or initial location of an identification device 16 (block 70) to be deployed/attached and transmitting the IDD work plan to a mobile terminal (block 72). At step 70, it is not yet necessary to pair any specific identification device 16 with any location. The mobile terminal 10 may include a location device 46 that defines the location of the mobile terminal (block 74). For example, the location device 46 may be a GPS device. Using the location of the mobile terminal 10, one or more work items within the IDD work plan may be provided to the mobile terminal, such as those closest to the user. Thus, the location of the mobile terminal 10 effectively organizes or prioritizes the work items in the IDD work plan for the user, such as based upon the location of the user and the relative proximity of the different work items. The approximate locations of the identification device 16 may be displayed on the mobile terminal 10 in a human-readable form (block 78), and the user may then select one of the locations (block 80). The user then attaches an identification device 16 to the location 18 according to the selected location (block 82). The identification device 16 is then read in proximity with the mobile terminal 10, e.g., by touching the identification device with the mobile terminal, with the mobile terminal 10 to obtain identification information (ID) or other information stored on the identification device 16 (block 84). At the same time or about the same time as reading the identification device 16, the location device 46 may define the location (e.g. coordinates) of the identification device based on the location of the mobile terminal 10 (block 86). Depending on the desired accuracy of the deployed location or the accuracy of the location device 46, the user may position the location device 16 proximate or adjacent to the identification device to obtain the location of the identification device. Thus, an actual or deployed location of the identification device 16 may be different than the approximate or initial location defined by the IDD work plan, and may be provided automatically without requiring the user to manually enter the location. The location defined by the location device 46 and identification information read from the identification device 16 may then be provided to the user, typically via the display 44 (block 88). If the user is satisfied with the location and information read from the identification device 16, the user may instruct the mobile terminal 10 to pair the identification device 16 and the defined location and store the information and update the location information previously defined in block 76 (block 90) if necessary in the IDD work plan. The IDD work plan may be updated on the mobile terminal 10, or the location and identification information may be provided to the server 14 to update the IDD work plan (block 92). The process is repeated to deploy identification devices 16 associated with any remaining work items within the IDD work plan (block 94).

It is understood that the above-described methods for deploying an identification device are not meant to be limiting. In this regard, it is understood that the steps shown in the flowcharts of FIGS. 3 and 4 are not limited to a particular chronological order. For example, with respect to FIG. 3, it is understood that the user may provide the location at any desired time, such as before or after attaching the identification device 16 to the location 18 or reading the information from the identification device. Moreover, with respect to FIG. 4, the location device 46 need not necessarily define a deployed location prior to attaching the identification device 16 at a selected location 18, as the location of the identification device may be provided when the mobile terminal 10 reads the identification device or after reading the identification device. Thus, the work item may initially include a general description or initial location of the identification device 16, and the user may provide a more accurate deployed location of the identification device with the location device 46 when attaching the identification device at a location 18. Moreover, the mobile terminal 10 may not store the identification information and location, but may rather immediately transmit the information to the server 14 for updating the work plan. Thus, the information may be stored and sent upon the user's command or periodically transmitted to the server 14, or the information may be transmitted to the server in real time. Similarly, displaying or verifying the information on the mobile terminal 10 may not be necessary in some embodiments.

FIGS. 3 and 4 are flowcharts of a system, methods, and program products according to exemplary embodiments of the invention. It will be understood that each block or step of the flowchart, and combinations of blocks in the flowchart, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of the mobile terminal and executed by a built-in processor in the mobile terminal. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

Embodiments of the present invention may provide several advantages. For example, a mobile terminal 10 may be used to associate a location 18 of an identification device 16 with identification information of the identification device and the associated work item. In addition, the mobile terminal 10 may be employed to update a work plan including the identification device 16 so that one or more work items associated with the identification device may be performed in the future. The location of the identification device 16 may be provided using various techniques, such as allowing a user to enter the location of the identification device or using a location device 46. The location device 46 may automatically provide the location of the identification device based on the location of the mobile terminal and may also define the location of the identification device as the mobile terminal reads the identification device. Thus, the location 18 may be accurately provided in order to update the work plan at the mobile terminal 10 or the server 14, as well as associate the location with the identification of the identification device 16.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
   receiving a work plan comprising at least one work item at a mobile terminal, wherein the at least one work item includes an initial location of at least one identification device and at least one task associated with redeploying the at least one identification device, said identification device is physically separated from the mobile terminal;
   reading identification information contained on the identification device at or in the proximity of the initial location using the mobile terminal;
   identifying a deployed location of the at least one identification device using the mobile terminal, the deployed location of the at least one identification device being different than the initial location of at least one identification device;
   moving the at least one identification device to the deployed location;
   moving the mobile terminal proximate to the at least one identification device at the deployed location;
   providing from the mobile terminal the identification information and the corresponding deployed location that are associated with the identification device thereby updating the work plan; and
   verifying that the at least one task was performed.

2. The method according to claim 1, wherein providing the identification information and the corresponding deployed location comprises causing, at least in part, actions that result in transmission of the identification information and corresponding deployed location to a network entity for updating the work plan.

3. The method according to claim 1, wherein identifying a deployed location of the at least one identification device comprises causing, at least in part, actions that result in reception of user input of the location of the mobile terminal.

4. The method according to claim 1, further comprising attaching the at least one identification device to a physical location associated with a work item.

5. The method according to claim 1, further comprising storing the identification information and the corresponding deployed location with the mobile terminal.

6. The method according to claim 1, wherein identifying a deployed location of the at least one identification device comprises determining a location of the mobile terminal with a location device residing on the mobile terminal.

7. The method according to claim 6, further comprising defining a deployed location of at least one identification device in the work plan according to the location of the mobile terminal prior to heading the identification information.

8. The method according to claim 7, further comprising allowing a user to select at least one work item within the work plan based on the deployed location of the at least one identification device defined by the location of the mobile terminal prior to reading the identification information.

9. The method according to claim 6, wherein identifying a deployed location of the at least one identification device comprises defining the deployed location of the identification device according to the location of the mobile terminal, the identification device includes an RFID tag.

10. The method according to claim 9, further comprising displaying the defined deployed location of the identification device on the mobile terminal.

11. The method according to claim 9, wherein reading the identification information occurs approximately simultaneously with defining a deployed location of the at least one identification device according to the location of the mobile terminal.

12. A tangible non-transitory computer-readable storage medium having stored thereon or more sequences of one or more instructions which, when executed by one or more processors, cause an apparatus to at least perform the following steps:
    receiving a work plan comprising at least one work item at the mobile terminal and at least one task associated with redeploying the at least one identification device, wherein the at least one work item includes an initial location of at least one identification device, said identification device is physically separated from the mobile terminal;
    reading identification information contained on the identification device at or in the proximity of the initial location;
    identifying a deployed location of the at least one identification device, the deployed location of the at least one identification device being different than the initial location of at least one identification device;
    reading identification information contained on the identification device at or in the proximity of the deployed location;
    providing the identification information and the corresponding deployed location that are associated with the identification device thereby updating the work plan; and
    verifying that the at least one task was performed.

13. The tangible non-transitory computer-readable storage medium according to claim 12, wherein the apparatus is caused to further perform: causing, at least in part, actions that result in transmission of the identification information and corresponding deployed location to a network entity for updating the work plan.

14. The tangible non-transitory computer-readable storage medium according to claim 12, wherein the apparatus is caused to further perform: causing, at least in part, actions that result in reception of user input of the location of the mobile terminal.

15. The tangible non-transitory computer-readable storage medium according to claim 12, wherein the apparatus is caused to further perform: storing the identification information and the corresponding deployed location.

16. The tangible non-transitory computer-readable storage medium according to claim 12, wherein the apparatus is caused to further perform: determining a location of the mobile terminal with a location device residing on the mobile terminal.

17. The tangible non-transitory computer-readable storage medium according to claim 16, wherein the apparatus is caused to further perform: defining a deployed location of at least one identification device in the work plan according to the location of the mobile terminal prior to reading the identification information.

18. The tangible non-transitory computer-readable storage medium according to claim 16, wherein the apparatus is caused to further perform: defining the deployed location of the identification device according to the location of the mobile terminal, wherein the identification device includes an RFID tag.

19. The tangible non-transitory computer-readable storage medium according to claim 18 wherein the apparatus is caused to further perform: displaying the defined deployed location of the identification device on the mobile terminal.

20. The tangible non-transitory computer-readable storage medium according to claim 18, wherein the apparatus is caused to further perform: reading the identification information approximately simultaneously with defining the deployed location of the at least one identification device according to the location of the mobile terminal.

21. A mobile terminal comprising:
at least one processor; and
at least one memory including computer program code, the at least one memory and the computer program code configured to, with the at least one processor, cause an apparatus to perform at least the following:
receive a work plan comprising at least one work item at the mobile terminal and at least one task associated with redeploying the at least one identification device, wherein the at least one work item includes an initial location of at least one identification device, said identification device is physically separated from the mobile terminal;
read identification information contained on the identification device at or in the proximity of the initial location;
identify a deployed location of the at least one identification device, the deployed location of the at least one identification device being different than the initial location of at least one identification device;
read identification information contained on the identification device at or in the proximity of the deployed location;
provide the identification information and the corresponding deployed location that are associated with the identification device thereby updating the work plan; and
verify that the at least one task was performed.

22. The mobile terminal according to claim 21, further comprising a user interface configured to allow a user to provide the deployed location of the at least one identification device.

23. The mobile terminal according to claim 21, further comprising a display configured to display the deployed location of the at least one identification device and associated identification information.

24. The mobile terminal according to claim 21, further comprising a memory configured to store the deployed location of the at least one identification device and associated identification information.

25. The mobile terminal according to claim 21, further comprising a location device configured to provide a location of the reader, wherein the apparatus is further caused to interpret the location of the reader as the deployed location of the at least one identification device.

26. The mobile terminal according to claim 25, wherein the location device comprising a global positioning system.

27. A system comprising: a mobile terminal comprising:
at least one processor; and
at least one memory including computer program code, the at least one memory and the computer program code configured to, with the at least one processor, cause an apparatus to perform at least the following:
receive a work plan comprising at least one work item at the mobile terminal and at least one task associated with redeploying the at least one identification device, wherein the at least one work item includes an initial location of at least one identification device, said identification device is physically separated from the mobile terminal;
read identification information contained on the identification device at or in the proximity of the initial location;
identify a deployed location of the at least one identification device, the deployed location of the at least one identification device being different than the initial location of at least one identification device; and
provide the identification information and the corresponding deployed location that are associated with the identification device;
read identification information contained on the identification device at or in the proximity of the deployed location;
a network entity configured to receive the identification information and the deployed location and to update the work plan; and
verifying that the at least one task was performed.

28. A mobile terminal comprising:
a receiver configured to receive a work plan comprising at least one work item including an in initial location of at least one identification device and at least one task associated with redeploying the at least one identification device, wherein the at least one work item includes an initial location of at least one identification device, said identification device is physically separated from the mobile terminal;
a reader configured to read at or in the proximity of the initial location identification information contained on the at least one identification device; and
a processor configured to receive the work plan from the receiver and the identification information from the reader, the processor also configured to identify a deployed location of the at least one identification device based upon the identification information in order to update the work plan, the deployed location of the at least one identification device being different than the initial location of at least one identification device, wherein the reader is further configured to read at or in the proximity of the deployed location identification information contained on the at least one identification device and verify that the at least one task was performed.

29. A mobile terminal according to claim 28, wherein the processor is further configured to transmit the identification information and the deployed location of the at least one identification device to the network entity to permit the work plan to be updated.

30. A mobile terminal according to claim 28, wherein the processor is further configured to update the work plan based upon the identification information and the deployed location of the at least one identification device.

31. A mobile terminal according to claim 28, wherein the receiver is further configured to receive the deployed location from a user interface.

32. A mobile terminal according to claim 28, wherein the receiver is further configured to receive the deployed location from a location device.

* * * * *